Aug. 19, 1952     R. C. STURKEN     2,607,712
EXTRUSION COATING MACHINE
Filed Jan. 28, 1952
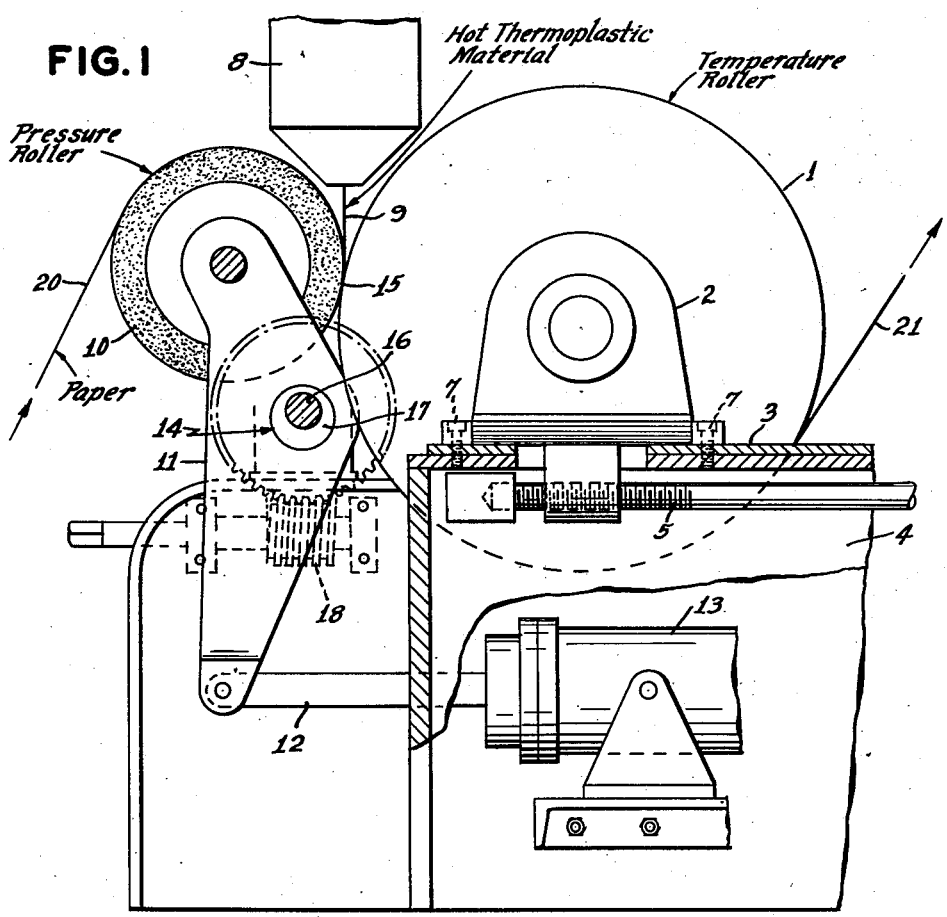
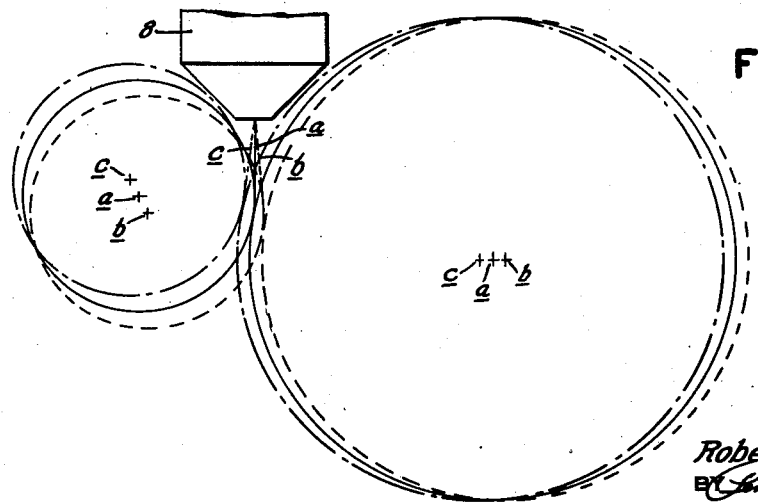
INVENTOR
Robert C. Sturken
ATTORNEYS Patented Aug. 19, 1952

2,607,712

UNITED STATES PATENT OFFICE 2,607,712

EXTRUSION COATING MACHINE

Robert C. Sturken, New Brunswick, N. J., assignor to Frank W. Egan & Company

Application January 28, 1952, Serial No. 268,555

4 Claims. (Cl. 154—1)

This invention relates to paper coating machines and more particularly to improvements in machines which utilize rollers to bond a sheet of hot thermoplastic material to the surface of a strip of paper in a continuous operation under controlled pressure and temperature.

In a paper coating machine of the class described, the laminating head of the machine comprises two cooperating counter-rotating rollers having their longitudinal axes parallel and bearing against each other at their line of contact or nip. One of these rollers is provided with internal means to control the temperature of its outer surface and will hereinafter be denominated the temperature roller. The other of the rollers, hereinafter called the pressure roller, is arranged to exert a continuous controllable force against the temperature roller at their line of contact. A continuous strip or web of material to be coated, such as paper, metal foil, or cloth for example, is carried partly around the pressure roller and through the nip of the rollers. A continuous sheet of hot thermoplastic material, such as polyethylene resin, formed by an extruder sheeting die immediately adjacent and parallel to the nip of the rollers is introduced between the rollers at their nip and is bonded to the exposed surface of the paper or other material under the action of the temperature change and pressure applied by the rollers.

It has been found that for proper bonding of the paper and plastic a minimum of cooling of the plastic must occur between its extrusion from the die and its introduction to the nip of the rollers. I have found two major sources of heat loss in machines of this class prior to my present invention. The first has been premature contact of the hot thermoplastic sheet with either the surface of the temperature roller or the paper passing over the pressure roller. This premature contact occurs when the plastic sheet enters the nip of the rollers other than tangentially. While it is relatively easy under static conditions to align the extruder die to present the plastic sheet to the rollers in a plane tangent to them at their nip, dynamic effects resulting from the high speed rotation of the rollers, eddying currents of air on opposite sides of the plastic sheet, and differing physical properties of the plastic unite to displace the sheet from the plane which is tangent to both rollers under static conditions. Consequently, the hot plastic sheet touches either the temperature roller or the paper before entering the nip; the temperature of the plastic is reduced; the tackiness of the plastic is lessened; and an imperfect bonding of the paper and plastic results. Attempts to remedy this difficulty have led to the second source of heat loss. Movement of the extruder die to align the plastic sheet tangentially of the rollers necessitates moving the die away from the rollers to avoid interference with them. But this elongates the exposed section of the hot plastic sheet which results in greater loss of heat to the eddying air currents following the high speed rollers. The present invention minimizes both of these avenues of heat loss.

I have found that the entry of the plastic sheet to the nip of the rollers must be in a plane quite accurately tangent to the rollers at their nip to preclude cooling of the hot plastic sheet through premature contact with paper or roller. An accurate statement of this condition, in view of the fact that the rollers are separated by the thicknesses of the paper and plastic, and have no actual line of contact, is that the plane of the plastic sheet entering the nip of the rollers must be parallel to planes tangent to the rollers at the intersections of the surfaces of the rollers with a plane containing the axes of the rollers. However, throughout the discussion of the invention, "tangent to the rollers at their line of contact" or "nip" is to be understood to be equivalent to the more complex statement "parallel to planes tangent to the rollers at the intersections of the surfaces of the rollers with a plane containing the axes of the rollers."

The invention provides a novel means for tangentially conforming the rollers to any plane of entry the plastic sheet might assume under the varying circumstances set out above. According to the invention the rollers are provided with means for separately displacing their axes in mutually oblique directions and means to cause one of the rollers to follow the other when they are undergoing displacement, thereby displacing the line of contact of the rollers. This changes the inclination of the plane tangent to the rollers at their nip with respect to a reference plane, say the plane in which the plastic sheet is normally extruded from the die. Thus, when operating conditions of the machine cause the plastic sheet to be displaced from this reference plane, the rollers are made tangent to the plastic sheet by displacing their line of contact until the inclination of their common tangent plane corresponds to the inclination of the plastic sheet.

The greatest displacement of the line of contact of the rollers is obtained when the axes are made to be displaced in directions which are mutually perpendicular. The jaws of the usual 90° V-shaped sheeting die may provide a convenient reference. Thus, the axis of the pressure roller may be made to be displaced in a plane parallel to one face of the die while the axis of the temperature roller may be made to be displaced in a plane parallel to the other face of the die. It is not necessary, however, that the axes be displaced in perpendicular planes, and other references may be used.

Another advantage is that the nature of the means according to the invention provide not one, but a large number of locations of the rollers relative to the die which have a given inclination of their common tangent plane. For a given inclination of the tangent plane necessary to conform the rollers tangentially to the plastic sheet, the nip at one of this number of locations of the rollers will be nearer the die than any other location having the same inclination of the tangent plane. A minimum length of the exposed plastic sheet is obtained when the rollers are positioned at this nearest location of the nip to the die. Therefore, the invention accomplishes minimization of heat loss from the exposed length of the hot plastic sheet simultaneously with its provision for tangentially conforming the rollers to the plastic sheet. These features of the improvements provided by the invention minimize loss of heat from the plastic sheet through premature contact between the paper or temperature roller and through conduction and radiation to its ambient.

A preferred embodiment of the invention is disclosed in the following description and the accompanying drawings.

In the drawings:

Fig. 1 is a side elevation of the laminating head of a paper coating machine embodying the invention.

Fig. 2 is a diagrammatic representation of the side elevation of Fig. 1 showing typical displacements of the plastic sheet and corresponding positions of the rollers.

In a preferred embodiment of the invention, the laminating head is symmetrical about a central plane perpendicular to the longitudinal axes of the rollers. The temperature roller is made to be displaced in the horizontal direction while the pressure roller is made to be displaced in the vertical direction. With reference to Fig. 1, a motor-driven temperature roller 1, provided with internal means for controlling the temperature of its outer surface, is rotatably suspended from stanchions 2 at the extremes of its longitudinal axis. According to the invention, these stanchions are slidably mounted on plane horizontal bearing surfaces 3 of the frame 4 of the machine. Lead screw means 5 are provided to advance or retract stanchions 2 simultaneously with respect to the sheeting die 8.

A rubber covered pressure roller 10 is rotatably suspended from the upper ends of substantially vertical supporting arms 11 at the extremes of its longitudinal axis. The lower ends of the supporting arms 11 are engaged with connecting rods 12 respectively of pneumatic piston and cylinder means 13 which exert controlled forces tending to rotate the supporting arms 11 about shafts 14. Thus, the pressure roller 10 is continuously caused to exert a controlled force against the temperature roller 1 at their line of contact 15. The pneumatic cylinders 13 are also adapted to withdraw the pressure roller from the temperature roller by an amount sufficient to permit cleaning and threading of the laminating head of the paper coating machine.

Vertical displacement of the pressure roller in this preferred embodiment of the invention is obtained from an arcuate movement produced by an eccentric shaft means 14 by which the supporting arms 11 are mounted on the frame 4 of the machine. Horizontal components of this arcuate movement are compensated for by revolution of the pressure roller about the axes of the shafts on which its supporting shafts are mounted as the roller maintains contact with the pressure roller.

Shaft means 14 comprises two shafts having their longitudinal axes parallel, the inner shaft 16 being eccentrically journalled within the outer shaft 17. A protruding length of the inner shaft 16 is journalled in the supporting arm 11 intermediate of its length. The outer shaft 17 is journalled in the frame 4 of the machine and is provided with a worm and gear means 18 to rotate the shaft 17 about its longitudinal axis. The worms are interconnected by a shaft to insure equal rotation of the outer shafts 17. This in turn effects equal displacements of the ends of the axis of the pressure roller 10.

It is seen that utilizing the worm and gear means to rotate the outer shafts 17 through 180° effects a displacement of the inner shafts 16 of twice the amount of the inner shaft's eccentricity of the outer shafts. The supporting arms 11, and therefore, the pressure roller 10 may be displaced by an equal amount. In general, a vertical displacement of the pressure roller effected by rotation of the eccentric shaft means is accompanied by a horizontal displacement. This latter displacement is countered by revolution of the pressure roller 10 about the inner shafts 16 as the pneumatic cylinders 13 act to maintain forceful contact between the pressure and temperature rollers.

In the operation of the laminating head a continuous web of paper 20 from an external supply is passed partly around pressure roller 10 and through the line of contact of the rollers. A hot sheet of thermoplastic material 9 continuously formed by sheeting die 8 is introduced to the nip of the rollers where it is pressed against the exposed surface of the web of paper 20 and chilled by contact with the surface of temperature roller 1. The coated paper is carried out of the nip and partly around the temperature roller for further cooling of the plastic. At a point where the plastic is sufficiently cooled, the coated paper is led off the temperature roller to other machines for further processing.

To correct the operation of a laminating head which is producing imperfectly coated paper due to excessive cooling of the plastic prior to its encountering the paper in the nip of the rollers, the temperature roller is advanced or retracted with reference to the normal position of the plastic sheet while the pressure roller is raised or lowered until a combination of adjustments is obtained which makes the plane of entry of the displaced plastic sheet tangential to both rollers. This precludes loss of heat from the hot plastic sheet through premature contact with the paper or the temperature roller.

Referring to Fig. 2, solid lines show the rollers in positions a conformed to the hot plastic sheet being extruded in the normal plane. Positions b shown in dotted lines illustrate the condition of the plastic sheet having a convex displacement to the right of the normal plane. Temperature roller 1 has been displaced to the right and pressure roller 10 is displaced vertically to change the inclination of the plane tangent to the rollers at their nip. The apparent non-vertical displacement of the axis of the pressure roller results from the horizontal component added to the displacement of the pressure roller by the action of the pneumatic cylinders rotating the supporting arms to maintain continuous pressure between the rollers. The broken lines show positions c of the rollers conformed to a convex displacement of the plastic sheet to the left.

Concurrently with the foregoing adjustment, the rollers are adjusted to the plane of entry at the shortest distance of the nip of the rollers from the extruder die. Inasmuch as the improvements according to the invention provide a wide practical range of positions of the rollers having a given inclination of their common tangent plane, a nearest location of the nip to the die may be selected. This will ensure a minimum loss of heat to the rapidly circulating air near the rollers and contribute to a more nearly perfect union between the paper and plastic.

It is to be understood that my invention is not limited by the details of structure hereinbefore described, but only by the scope of the claims.

I claim:

1. A machine including parallel, counter-rotating rollers adapted to bond in the nip of the rollers a thin sheet of surfacing material to a surface of a continuous sheet of web-like material carried by one of said rollers through their nip, means for displacing one of said rollers in a first direction, means for displacing the other of said rollers in a direction oblique to the first direction, and means for effecting a continuous pressure between said rollers whereby the inclination of the plane tangent to the rollers at their nip may be conformed to the inclination of the sheet of surfacing material entering the nip.

2. A machine according to claim 1, in which the means for displacing one of said rollers causes the axis of that roller to describe an arcuate path, and the means for displacing the other of said rollers causes the axis of that other roller to describe a planar path.

3. A paper coating machine including parallel, counter-rotating rollers which apply controlled temperature and pressure to bond in the nip of the rollers a continuous sheet of thermoplastic material to a surface of a continuous web of paper carried by one of said rollers through their nip, the combination of means to displace the axis of one of said rollers in an arcuate path, means to displace the axis of the other of said rollers in a planar path, and means to effect a continuous pressure between said rollers whereby the inclination of the plane tangent to the rollers at their nip may be conformed to the inclination of the thermoplastic sheet entering the nip.

4. A laminating head of a paper coating machine comprising a rigid frame having plane horizontal bearing surfaces; stanchions slidably mounted on said bearing surfaces; a motor driven, controlled temperature roller rotatably suspended at the extremes of its longitudinal axis from said stanchions; a lead screw means to displace said stanchions in the horizontal direction; substantially vertical supporting arms; outer shafts journalled in the frame and provided with worm and gear means to rotate said outer shafts about their axes; an inner shaft eccentrically journalled in each of said outer shafts; a protruding length of each of said inner shafts journalled intermediate the length of said supporting arms; a rubber covered pressure roller parallel to said temperature roller and rotatably suspended between the upper ends of said supporting arms; pneumatic piston and cylinder means operatively connected to the lower ends of said supporting arms to exert forces which maintain continuing pressure between said pressure and temperature rollers; and a thermoplastic extruder die adjacent the pressure and temperature rollers.

ROBERT C. STURKEN.

No references cited.